F. M. TRIMBLE.
CHAIN FASTENER AND TIGHTENER.
APPLICATION FILED MAR. 9, 1921.

1,399,589.

Patented Dec. 6, 1921.

Inventor
F.M.Trimble,

By
Geo. F. Kimmel, Attorney

UNITED STATES PATENT OFFICE.

FRED M. TRIMBLE, OF HUMBOLDT, NEBRASKA.

CHAIN FASTENER AND TIGHTENER.

1,399,589.  Specification of Letters Patent.  Patented Dec. 6, 1921.

Application filed March 9, 1921. Serial No. 451,052.

*To all whom it may concern:*

Be it known that I, FRED M. TRIMBLE, a citizen of the United States, residing at Humboldt, in the county of Richardson and State of Nebraska, have invented certain new and useful Improvements in a Chain Fastener and Tightener, of which the following is a specification.

This invention relates to combined connectors and tighteners for attaching and holding two ends of a chain together and is particularly designed for use in connection with anti-skid chains used on automobile wheels.

The primary object of the invention is to provide a connector of this character combining simplicity of construction, strength, durability, and efficiency with ease of manipulation and insuring a safe and secure locking device.

Another object is to provide a device of this character which will reliably retain the ends of a chain connected in either open or closed position thereby preventing all possibility of the chain being lost owing to the parting of the ends.

Another object is to incorporate with a device of this character a tightening lever latch which in the operation of applying the chain to the tire will take up all slack in the chain by closing of the latch thereby resulting in the firm gripping of the tire by the chain.

With these and other objects in view, the invention consists in certain novel features of construction as hereinafter shown and described and then specifically pointed out in the claims and in the drawings illustrative of the preferred embodiment of the invention.

In the accompanying drawings—

Figure 1:
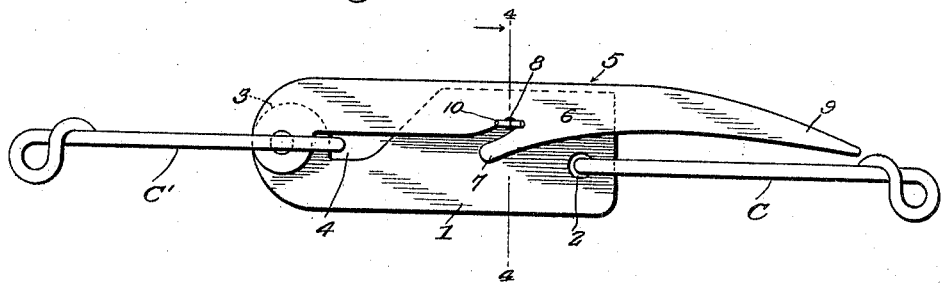
Figure 1 represents a side elevation of a skid chain fastener and tightener constructed in accordance with this invention and shown in closed operative position.

In the embodiment illustrated, a solid hook carrying member 1 is provided to one end of which the end link C of the tire chain is permanently secured in any suitable manner, it being here shown connected by passing it through an aperture 2 formed in said member. Pivotally secured to the bill 3 of the hook member 1 is a latch lever or arm 5, which is adapted to swing down over the inner edge of member 1 when closed. A seat 4 is formed at the base of the bill 3 of member 1 to receive the link C of the loose or free end of the chain. The seat 4 is in longitudinal alinement with the aperture 2 in said member thereby producing a direct line of strain on the body of the member 1 preventing any strain from being borne by the pivot connecting the members 1 and 5.

Figure 2:
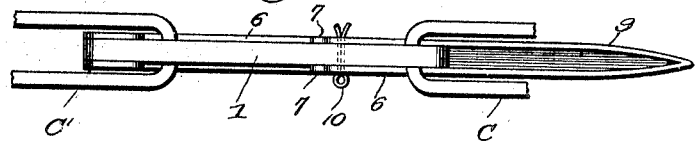
Fig. 2 is an edge view thereof.
Figure 4:
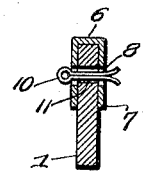
Fig. 4 is a transverse section taken on the line 4—4 of Fig. 1.

The pivoted latch lever 5 is constructed of plate metal, preferably of steel, folded longitudinally to provide laterally spaced lips 6 extending parallel with each other designed to receive between them the member 1 when the device is in closed position as is shown clearly in Fig. 2. On each lip 6 of said lever at a point about midway the length thereof is a safety hook 7 inclined inwardly toward the pivoted end of said latch and has an obliquely disposed forwardly inclined notch or seat 8 at the base thereof to receive the loose link C' of the chain to be connected, the hooks 7 forming a guard for the seats 8. The closing of latch 5 over the connecting bar or member 1 carries with the loose link C' of the chain along the edges of the lips 6 of said latch and over and around the hinged joint connecting the members 1 and 5. This link then passes to the seat 4 at the base of the bill 3 of the member 1. The closing of the latch member 5 causes the chain link C' to clear the inclined seats 8 formed at the base of the hooks 7 of said member, owing to the arrangement of said hooks over said seats forming guards therefor. After the latch has been closed, a cotterpin 10 is inserted through an opening 11 in the member 1 and through the seat 8, in member 5 as is clearly shown in members 1, 2, and 4 thereby permanently locking the members 5 and 1 in closed position.

Figure 3:
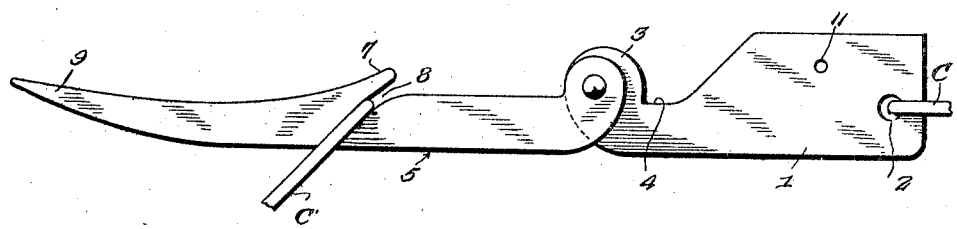
Fig. 3 is a side elevation of the fastener in open position.

It is understood that when connecting the chain ends by this improved fastener the parts are positioned as shown in Fig. 3 with the loose ends C' of the chain engaged in the seats 8 of the member 5 the closing of the member 5 operates to take up all slack in the chain and to direct said link C' into seat 4 as shown in Fig. 1.

To open the fastener, it is only necessary to remove the cotterpin 10 and swing the latch lever outward at a right angle to the member 1 when a slight force exerted on said latch will cause the loose link C' of the chain to slip from its seat 4 and pass over the lips 6 of member 5 and by positioning the link at a slight right angle it will pass over the hooks of member 5 and then may be readily disengaged or slipped off from the pointer terminal 9 of said latch member.

In the use of this improved safety latch tightener the strain of the chain is exerted in direct line of the connecting member 1 where it is at all times borne so long as the lock is in closed position. In the event that the cotterpin could loosen or be sheared off for any reason and the latch member 5 opened the free chain link C' would slip down over the lips 6 of the incline hook member 5 until it reached the seats for notches 8 of said latch under the inclined hook members 7, and the said members 7 would operate to direct the link into the seats 8 and where it would be firmly held until released by the user, there being no possible accidental escape for the chain end from the seat and consequently all danger of the chain being lost from the wheel is avoided.

While this improved fastener is described and shown as applied to a chain for automobile tires obviously it may be used for connecting the ends of other chains for various purposes.

The preferred embodiment of the invention is disclosed in the drawings and set forth in the specification, but it will be understood that any modifications within the scope of the claims may be made in the construction without departing from the principle of the invention or sacrificing any of its advantages.

Having thus described the invention what is new is:—

1. A fastener of the class described comprising a member having a bill at one end with a link receiving seat at its base and an aperture at its other end for permanent connection with a link at one end of the chain to be connected, a combined lever and latch member pivoted at one end to the bill of said first mentioned member and having a forwardly inclined seat in its inner edge provided with an overhanging guard.

2. A fastener of the class described comprising a member having a bill at one end with a link receiving seat at its base and an aperture at its other end, for permanent connection with a link at one end of the chain to be connected, a combined lever and latch member pivoted at one end to the bill of said first mentioned member and having a forwardly inclined seat in its inner edge provided with an overhanging guard, said guard being in the form of a hook-like member midway its ends directed toward the pivoted end thereof.

In testimony whereof, I affix my signature hereto.

FRED M. TRIMBLE.